Oct. 6, 1953  A. N. JENNISON  2,654,498
COLLAPSIBLE BOX FOR CARRYING DOGS
Filed April 14, 1950  2 Sheets-Sheet 1

Arthur N. Jennison
INVENTOR.

Oct. 6, 1953
A. N. JENNISON
2,654,498
COLLAPSIBLE BOX FOR CARRYING DOGS
Filed April 14, 1950
2 Sheets-Sheet 2
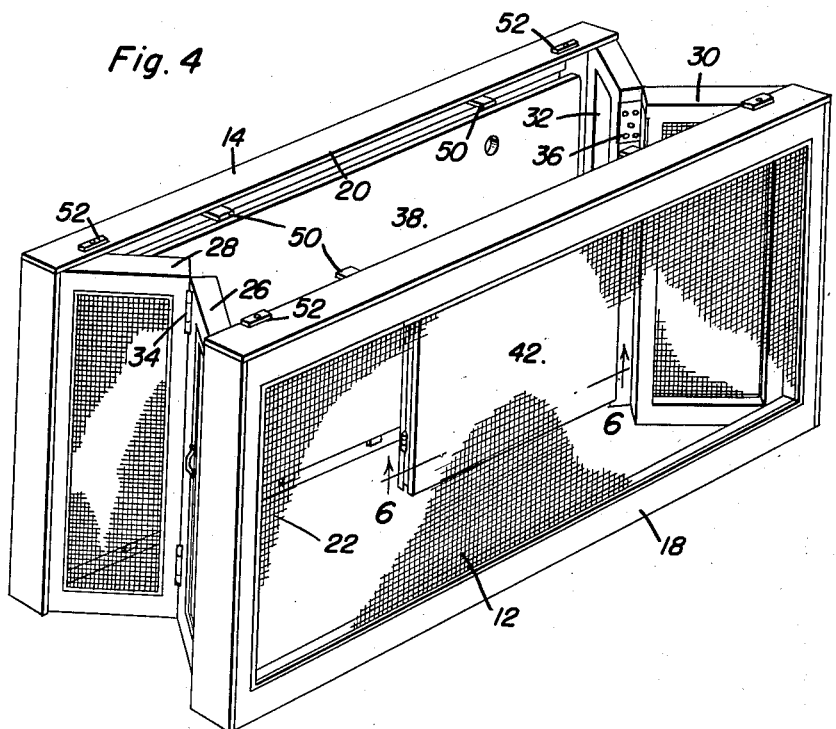
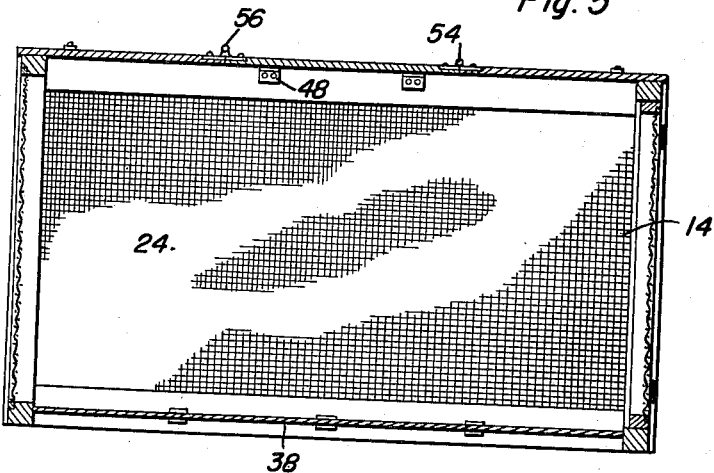
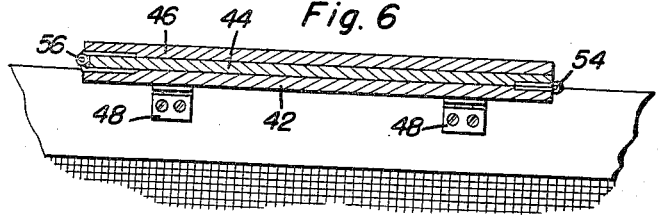
Arthur N. Jennison
INVENTOR.

Patented Oct. 6, 1953

2,654,498

UNITED STATES PATENT OFFICE 2,654,498

COLLAPSIBLE BOX FOR CARRYING DOGS

Arthur N. Jennison, Keene, N. H.

Application April 14, 1950, Serial No. 156,027

1 Claim. (Cl. 217—14)

This invention relates to the class of containers and receptacles, and more particularly to a collapsible box for carrying dogs inside automobiles or other motor vehicles.

An object of this invention is to provide a collapsible box for carrying a dog or other pet inside an automotive vehicle which, when not in use, can be readily collapsed to a relatively small compass.

Another object of this invention is to provide a collapsible box for carrying dogs through which the dogs may readily see due to the fact that the box is made from, in part, suitable wire mesh screening.

Still another object of the invention resides in the provision of a sectional top for the collapsible box which is rotatably secured to one of the side panel members of the box in such a manner that the top may be readily rotated out of the way of a dog when such animal is being placed within the box, yet which may be readily folded to a minimum compass when the box is in a collapsed state.

Still further objects of the invention reside in the provision of a collapsible box for carrying dogs that is strong, durable, highly efficient in operation, simple in construction and manufacture, capable of being readily manufactured from a variety of divergent materials, and which is relatively inexpensive.

These, together with the various ancillary objects of the invention which will become apparent as the following description proceeds, are attained by this invention, a preferred embodiment of which has been illustrated in the accompanying drawings, by way of example only, wherein:

Figure 4 is a perspective view showing the collapsible box for carrying dogs in an intermediate stage when being opened from the collapsed state to the opened position;

Figure 5 is a longitudinal sectional view of the invention; and

Figure 6 is a horizontal sectional view as taken along line 6—6 and being shown in an enlarged scale for greater clarity.

Figure 1:
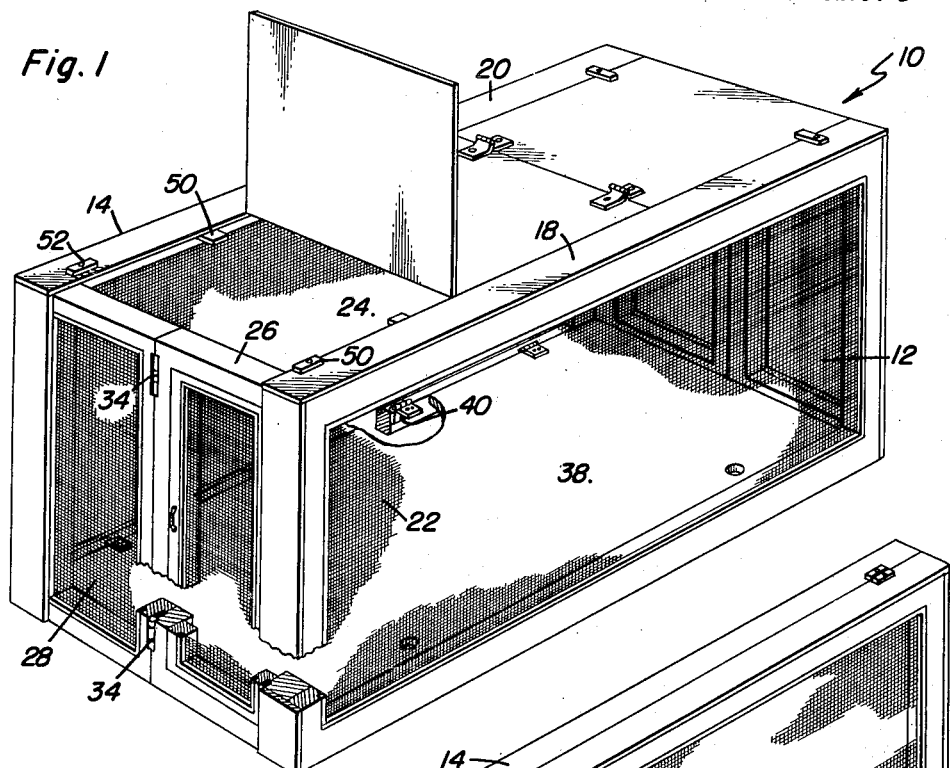
Figure 1 is a perspective view of the collapsible box shown in an open position.
Figure 2:
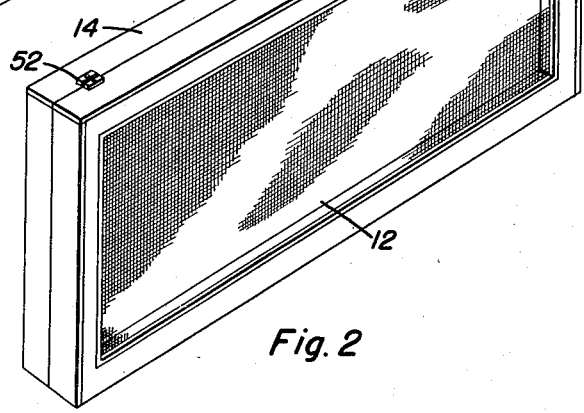
Figure 2 is a perspective view of the invention shown in its collapsed or folded condition.
Figure 3:
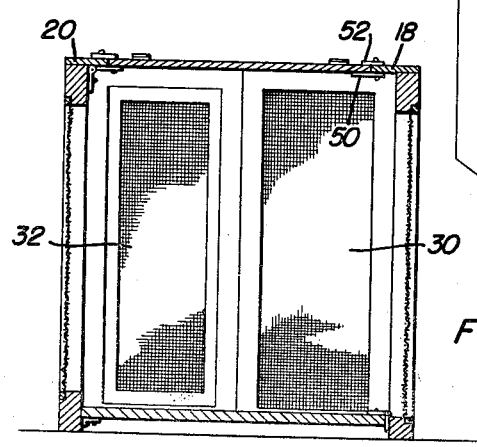
Figure 3 is a transverse vertical sectional view of the collapsible box.

With continuing reference to the accompanying drawings, wherein like reference numerals designate similar parts throughout the various views, the reference numeral 10 generally designates the collapsible box for carrying dogs inside such standard automotive vehicles as sedans or coaches. This box 10 comprises a pair of opposed side panel members 12 and 14 each of which consists of a peripheral frame 18 and 20, respectively, which may be formed of wood, metal or any other suitable material. Attached to the frames 18 and 20 is suitable wire mesh screening material 22 and 24 for permitting the entrance of air and allowing a dog or other pet animal to see outside of the box, thus reducing fright to the animal when it is being transported.

Terminally pivotally attached to the frame members 18 and 20 of the side panels 12 and 14 are end panel members which are formed from a plurality of sections such as those designated 26 and 28, and 30 and 32. Each of the side panel sections comprises a peripheral frame and a wire mesh screen extending between the area encompassed by the frame. The end sections 26 and 28 are pivotally secured to each other by suitable hinges such as those indicated at 34, and the end sections 30 and 32 are hingedly secured together by means of hinges 36. As can be readily understood, when the box is collapsed to its folding position, the end sections will fold inwardly, thereby permitting the box to collapse. Further, the peripheral frame members 18 and 20 are provided with an overhang in order that when the box is in a folded position, the frame members will abut, leaving space for the end panel members and for the bottom member 38 which is hingedly attached as at 40 to the side panel member 40. Furthermore, the overhang of the frame members 18 and 20 permits the top sections 42, 44 and 46 to be folded downward into the space between the abutting frame members. The central section 42 is pivotally attached by hinges 48 to the side panel member 12 and lugs 50 are provided to support the panel members 44 and 46 when the box is in the closed position. Furthermore, pivotally mounted lugs 52 are provided to lock the top section in a relatively secure manner. The top sections 44 and 46 are hingedly attached to the center top section 42 by means of hinges 54 and 56, respectively.

Since, from the foregoing, the construction and advantages of this collapsible box for carrying dogs inside automotive vehicles is readily apparent, further description is believed to be unnecessary.

However, since numerous modifications and changes will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claim.

Having described the invention, what is claimed as new is:

A collapsible box comprising a pair of opposite side panel members, pairs of end panel members hingedly attached in the pairs and hingedly attached to the side panel members for folding in between said side panel members to collapse the box, and a top comprising a central section having end and side edges, said top further comprising end sections hinged to opposite end edges of the central section and folding on one another against the top side of the central section, said central section being hinged at one side edge to one side panel and folding downwardly in between said side panel members with said end sections folded against said central section.

ARTHUR N. JENNISON.

References Cited in the file of this patent

UNITED STATES PATENTS

| Number | Name | Date |
|---|---|---|
| 232,680 | Cammann | Sept. 28, 1880 |
| 523,727 | McNeill | Aug. 21, 1894 |
| 1,464,391 | Orban | Aug. 7, 1923 |
| 1,585,328 | Chapotat | May 18, 1926 |
| 2,413,774 | Montgomery | Jan. 7, 1947 |

FOREIGN PATENTS

| Number | Country | Date |
|---|---|---|
| 227,728 | Switzerland | Sept. 16, 1943 |